Figure 1:
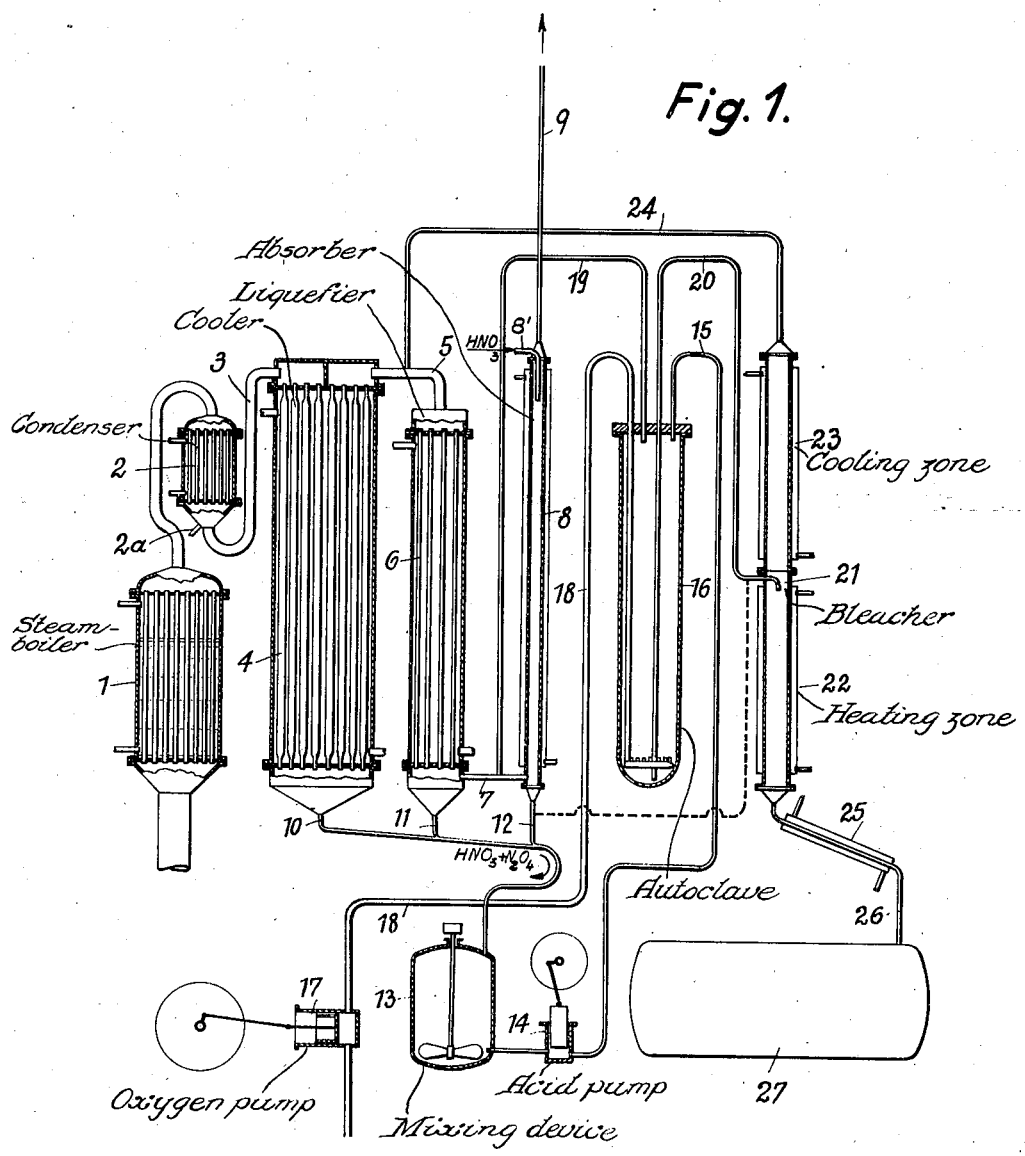

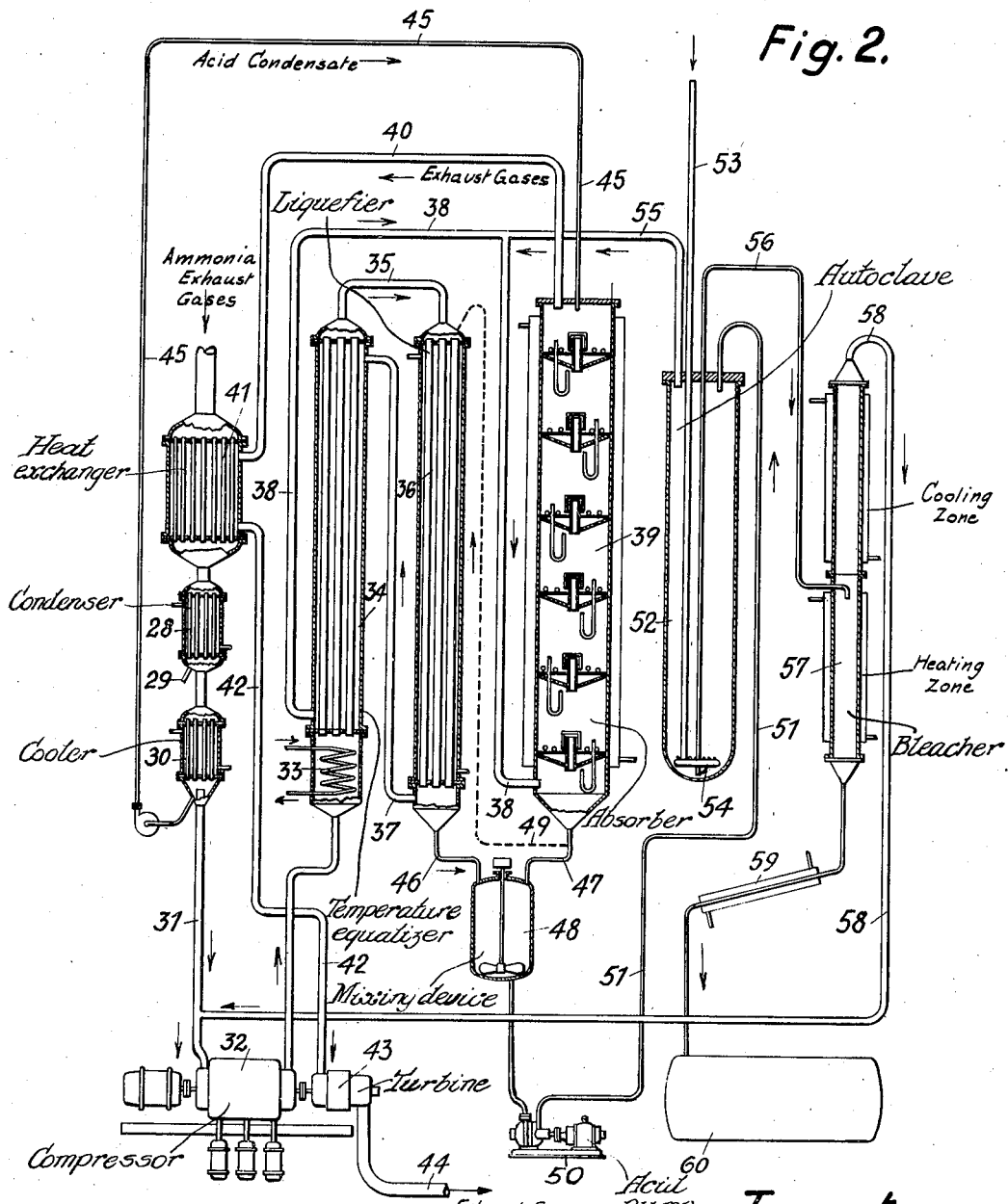

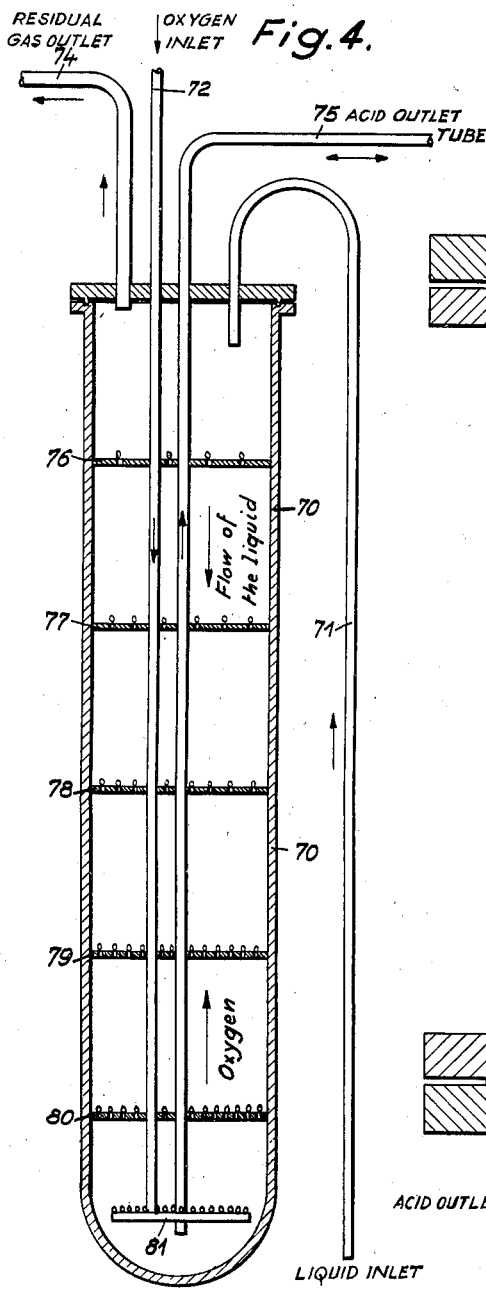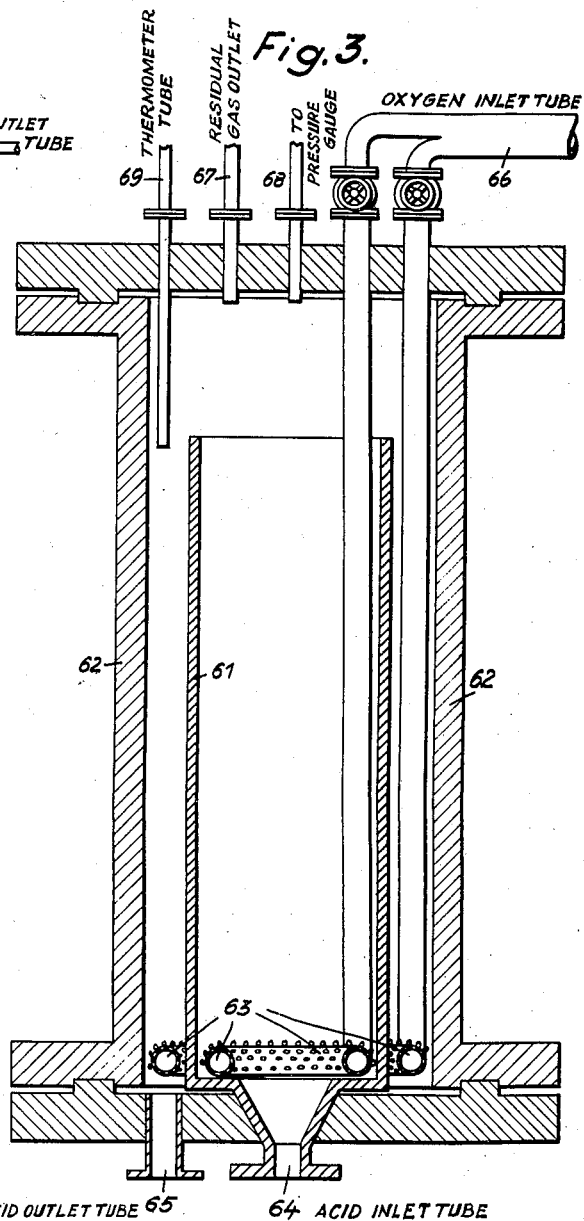

Patented Aug. 15, 1939

2,169,826

UNITED STATES PATENT OFFICE 2,169,826

PROCESS OF PRODUCING HIGHLY CONCENTRATED NITRIC ACID

Rudolf Wendlandt, Piesteritz, near Halle-on-the-Saale, Germany, assignor to Bayerische Stickstoff-Werke Aktien-Gesellschaft, Berlin, Germany Application December 30, 1932, Serial No. 649,513
In Germany December 30, 1931

4 Claims. (Cl. 23—162)

The present invention relates to a process of producing nitric acid of any desired high concentration from the combustion products of ammonia and the object of the invention is to provide a simple and practical process of the above said kind, which may be carried out in a continuous working cycle. This was hitherto not possible. Another object of the invention is to conduct the process in such a manner, that the amount of ammonia introduced into the process is totally utilised.

According to the invention highly concentrated nitric acid, i. e. nitric acid of about 70% or more is produced in a single continuous working process by oxidizing ammonia to nitric oxide, producing water-containing nitric acid and liquid nitrogen oxides preferably nitrogen tetroxide from this oxide, mixing the substances thus obtained in a proportion at which a highly concentrated nitric acid will be obtained, pumping the mixture into a reaction space, thereby increasing the pressure considerably, supplying oxygen to the reaction space and removing highly concentrated nitric acid from this space. Through these measures the condensation of the combustion or oxidation products of ammonia is combined with the known process of producing highly concentrated nitric acid from liquid nitrogen tetroxide, water-containing nitric acid and oxygen at raised pressures and temperatures to form a continuous working process. On account of this, highly concentrated nitric acid, of 98–100%, may be obtained from the oxidation products of ammonia without any more expenses, and control work than at the usual producing of commercial nitric acid. The process may, of course, also be employed for producing nitric acid of other concentrations than those mentioned above, for instance nitric acid of 80 or 90%.

The water-containing nitric acid and the liquid nitrogen tetroxide may be produced in a particularly simple manner by oxidizing ammonia with oxygen or air rich in oxygen at atmospheric or at raised pressure. If the treatment is performed with atmospheric air or with air, which is only slightly enriched with oxygen, the water-containing nitric acid and the liquid nitrogen tetroxide should preferably be produced at raised pressure. This raised pressure may already be created before the oxidation of ammonia takes place. This process is effected in a single continuous operation by oxidizing ammonia catalytically with atmospheric air to nitric oxides at pressure ranging between 2 and 10 atmospheres, utilizing the heat of the nitrous gases formed, condensing and removing the surplus of steam in said gases, converting said gases into a liquid mixture which contains water containing nitric acid and nitrogen oxides in proportions suitable for the production of highly concentrated nitric acid, pumping the mixture into a reaction space, thereby increasing the pressure considerably, supplying oxygen to the reaction space and removing highly concentrated nitric acid from said space. It may, however, also in several cases be advantageous to compress the combustion or oxidation products of ammonia, previously by means of a turbo compressor. The products condensed under pressure are conducted to the pressure pumps without reducing the pressure acting on the said products. The reaction products may hereby be passed through equalizing or mixing vessels or the like. The pumps proper will raise the pressure considerably, whereby the expedient creating the original pressure will be relieved.

When working in accordance with the present invention, the following measures are of particular importance: The pumps (or at least one of the pumps), by means of which the obtained fluids are forced through the system under considerably increased pressure, should be lubricated with inorganic colloids, for instance oxyhydrates, such as aluminium hydroxide, silicic acid and the like. The lubricant may be in the form of a brine or a gel and may contain any amount of water, nitric acid or tetroxide. The lubricating process is highly improved when inorganic colloids are used. If, for instance, precipitated silica gel of grease-like nature is pressed into the lubricating ducts and rings of a plunger pump, the said substance will mix with liquid nitrogen tetroxide, whereby a dispersion of oily nature is created, which still is an excellent lubricant. Only inorganic colloids will give a satisfactory lubricating effect.

The fluid should preferably be fed to the pumps at temperatures below 0° C., for instance at temperatures of —5° or —10° C. This is recommended in spite of the fact that the absorption of oxygen is accelerated when the temperature is raised. It has been found, that, when the said low temperatures are used, the pumping operation may be carried out safely without risking any disturbances. It may in some cases also be advantageous to cool the pump cylinder proper and the plunger of the pump. If it is desired to preheat the fluid, the preheating should preferably be performed after the pressure has been increased.

The fluids obtained may be pumped into the reaction space by means of different pressure pumps. It is, however, advantageous to use only a single pressure pump for the total mixture obtained, since the fluids in this case will influence each other mutually already before the pressure is raised. A particularly uniform working process is obtained, when the fluids are mixed to an emulsion. This may for instance be performed in a stirring device. In such case a single test will show in which manner the entire liquid substance is composed. The emulsion may be formed before or after the increase of pressure and may, if desired, be formed in the reaction space proper. Also the oxygen may partake in the formation of the emulsion. The oxygen is supplied to the fluid in the reaction space in any convenient manner, for instance through a tube which ends adjacent the bottom of the autoclave used. The time needed for absorption may be considerably shortened by adding the oxygen in finely distributed state. The oxygen may, for instance, be forced into the fluid through sieve plates. Ceramic filters will, however, exert a still better effect than sieve plates. If the oxygen is pressed into the fluid through ceramic filters, the time needed for absorption may be reduced to a fraction of that needed when no distributing devices are employed.

A mixture of nitrogen tetroxide and water-containing nitric acid will even at normal or slightly raised pressure absorb oxygen. The amount of oxygen absorbed under such conditions will, of course, always be smaller than that absorbed at a high pressure. When the fluid is saturated with oxygen before the pressure is increased, part of the compression work needed for the gaseous oxygen will be saved. When working under such conditions, the heat produced at the pre-saturation with oxygen may be utilized for the after-saturation under high pressure, i. e., the fluid should be subjected to the pump treatment without previous cooling. In other words, the fluid is supplied to the high pressure pump in hot state and under pressure. This pressure may, for instance, be the same pressure at which the fluid was produced and pre-saturated. If the producing of the fluid has taken place without pressure, a low pressure pump is arranged in front of the high pressure pump. Also in other cases the pressure may be raised in two or more stages, or the reaction space may be subdivided in a plurality of temperature and pressure stages. When the reaction space is arranged in this manner, the oxygen is preferably forced from one stage of pressure to the next in counter current to the fluid.

Also oxygen or oxygeneous gas may be produced under pressure, for instance by means of pressure electrolysis, and the oxygen may be allowed to act upon the fluid at this pressure. Instead of pressure electrolysis, of course a compressor or other mechanical devices may be used for increasing the pressure of the oxygen. The oxygen may also be directly fed to the reaction space through which the fluid is circulated. In this manner the costs of the compression of the oxygen may be partially or completely saved.

The oxygen used should preferably be completely pure. Normally the oxygen will, however, always contain some contaminations and the process may also be performed with relatively low percent oxygen or with air. Non-absorbed gaseous constituents (for instance $N_2$, argon and their content of oxygen and nitrogen peroxide) are drawn off from the autoclave and are, according to the content of oxygen and nitrogen peroxide, added to the exhaust gas or reintroduced into the condensation process; when working with pure oxygen the process may be conducted in such manner that no exhaust gases are formed. Oxygen which is not absorbed, may in any case be recovered and used anew. The highly concentrated acid formed in the autoclave is preferably removed from the reaction space together with a residual content of dissolved nitrogen oxides. These dissolved nitrogen oxides may thereupon be driven out in the form of a gas, for instance by heating the acid. The nitrogen oxides are thereupon reintroduced into the condensation process. The removal of the dissolved nitrogen peroxide from the highly concentrated acid may be facilitated by previously reducing the pressure acting on the acid. Preferably the pressure is reduced to the working pressure of the tetroxide liquefier. This bleaching process is particularly simple when working at atmospheric pressure. If no particularly high concentration of the acid is required, the reaction may also be conducted in such a manner that the acid, when leaving the reaction space, contains no $N_2O_4$ at all or only so small an amount of this compound, that it without any detrimental effects may be left in the acid. This manner of proceeding may, for instance, be employed when acid of 80–90% is to be produced.

The reaction in the pressure space may be performed in several different manners. It is, for instance, advantageous to create a contact area as large as possible between the gas and the fluid and the oxygen is preferably forced through the fluid in counter current to the latter. A large contact area may be produced in any known manner, for instance by introducing the oxygen into the fluid in finely distributed state, by introducing the fluid into the oxygen in finely distributed state, or by employing a combination of these measures. The pressure tube may always be kept filled with fluid and the oxygen may be caused to ascend through this column of fluid in finely distributed state. The fluid may also be passed over a series of sieve bottoms (which should be equipped with over-flow devices), and in this case the oxygen is preferably introduced, in finely distributed state, into a fluid layer at the bottom of the pressure tube. From this layer the oxygen will ascend and penetrate the layers of fluid on the said sieve bottoms until the entire charge has been brought into contact with the oxygen. The cross-sectional area of said sieve bottoms, through which the oxygen is penetrating, may in this case be altered in accordance with the desired absorption of oxygen. It is, of course, not necessary to pass the oxygen in counter current through the fluid. The gas may also be conducted through the reaction space in the same direction of flow as the fluid or transversely with respect to the direction of flow of the fluid. When the oxygen and the fluid are fed in the same direction through the reaction space, the oxygen may also be introduced immediately after the pressure has been raised, i. e., directly behind the pressure pump. It is also possible to work partially after the countercurrent principle and to partially conduct the gas through the reaction space in the same direction as the fluid. In this case for instance a cylindrical reaction chamber, comprising an axial tube, may be used. The fluid is caused to ascend through the tube and to descend through exterior annular space, and the oxygen is caused to ascend through both sections of the chamber in finely distributed state.

The process may be carried out at any desired pressures and temperatures. It is, however, advantageous to work at pressures above 20 atmospheres. The working pressure is dependent upon the degree of concentration wanted. The higher the required concentration of the acid is, the higher the pressure should be. If it is desired to produce, for instance, a nitric acid of 97–100%, pressures of 40–60 atmospheres would be advantageous, but also lower or higher pressures, for instance a pressure of 200 atmospheres, may be employed. The use of raised temperatures and pressures is known per se. Also in combination with the present process the use of raised temperatures is advantageous. Preferably the reaction heat created by the absorption of oxygen is utilized for increasing the temperature. The reaction space may also be heated by means of hot water, electrical devices or indirect steam, but additional expedients of this kind are commonly not needed. In some cases the crude materials are preheated. In order to obtain the proper temperatures during the treatment, the cold crude materials and the hot intermediate or final products may be used for creating an exchange of heat. This exchange of heat may be performed within the reaction space (which may be equipped with compensating surfaces or the like) or on the outside of the reaction space. It is also possible to create the desired exchange of heat through the walls of the reaction chamber. The pressure space, in which the highly concentrated acid is produced, may, for instance, be held at a definite temperature, for instance at 85° C. It is usually advantageous to pass the material through the pressure space at different temperatures, i. e., to adjust the temperature at any moment to the value which is most advantageous at the case in question. It is of importance to note that the rate of reaction increases with increasing temperature and that the chemical balance is improved when the temperature decreases. When working with exhaust gases, also the composition of these gases should be taken into consideration. When the starting materials are introduced into the reaction space in cold or hot state, and the process is conducted in the manner indicated above, the temperature in the reaction space will attain a maximal value, for instance of 80–100° C., and will decrease to 70 or 50° C. at the point at which the acid is removed. It is in any case advantageous that the temperature at at least one point of the reaction space exceeds 70° C.

The parts of the reaction apparatus, which are influenced by oxygen under pressure and by the reaction mass may be produced from any sufficiently stable material of known kind, such as, for instance, pure aluminium, aluminium alloys, acid-resistive steel, ferro-silicium, ceramic material, enamel, platin metals, tantal, niob or the like. The above named materials may, of course, also be used in combination or in the form of alloys. Since a highly concentrated acid is produced, the apparatus does not require much space, particularly when extremely highly concentrated acid is to be produced. The space needed for the apparatus increases in correspondence with the increase of the water content of the acid produced. The reaction device does neither require much space, since the reaction takes place in the device or tube through which the oxygen is introduced.

The process described above may also be employed when only a part of the combustion products of ammonia is to be converted into highly concentrated nitric acids.

The process is illustrated in the accompanying drawings, in which:

Figure 1 is a diagrammatic showing of an arrangement of apparatus for carrying out the process, Figure 2 is a diagrammatical view of a modified form of the apparatus, Figure 3 is a section through a modified form of pressure pipe or tube together with its connections, and Figure 4 is a section through another modified form of pressure pipe or tube and its connections.

When using the plant shown in Fig. 1 the novel process may, for instance, be carried out in the following manner:

*Example 1*

Ammonia is oxidized with oxygen of 90–100% at normal pressure whereby suitably 1.5–2.5 parts by volume of $O_2$ are allowed to act upon 1 part by volume of $NH_3$. 35% by volume of $NH_3$ may, for instance, be treated after any desired method in pure oxygen with or without addition of steam. The nitric oxide mixture is passed through the steam boiler 1. If desired, part of or the total amount of steam may be supplied to the ammonia mixture before this reaches the catalyzer. This treatment may, for instance, be performed in accordance with United States Patent No. 1,850,129. The mixture leaving the boiler 1 enters the water-cooled condenser 2. This condenser as well as the boiler 1 and the intermediate tube should contain as small a gas space as possible. The surplus of water in the gas mixture is condensed in the condenser 2 and drawn off at 2a. Through the tube 3 the gas mixture is conducted into the amply dimensioned cooler 4, which for instance may consist of tubes having an internal diameter of 200–300 mm. In this condenser the gases are subjected to water-cooling and will oxidize to $NO_2$ or $N_2O_4$. Simultaneously the water needed for the producing of the highly concentrated acid will be condensed in the cooler 4 in the form of a nitric acid, containing water and nitrogen oxides. The oxidized and cooled gas flows through the tube 5 into the brine-cooled liquefier 6, in which liquid nitrogen tetroxide is condensed. Small amounts of non-condensable gas (for instance $N_2$, $O_2$, argon leave the liquefier 6 and enter the brine-cooled tube 8 through the tube 7. The nitrogen oxides present are dissolved in highly concentrated nitric acid, which in highly cooled state is applied to the upper end of the tube 8 by means of an inlet pipe 8'. The apparatus should preferably be arranged in such a manner that the brine at first cools the acid, thereupon the tube 8 and finally the liquefier 6. The brine is preferably conducted into the liquefier at a temperature of about −11° C. The low temperature needed is partially created through evaporation of the treated ammonia. In order to be able to utilize this ammonia, the evaporator is coupled into the brine circulation. The remaining gas finally escapes through the tube 9, which is connected to the upper end of the tube 8. The loss of gases is very low and usually amounts to lesser than 0.5% of the nitrogen introduced into the process. The condensates flowing off through the tubes 10 and 11 are fed into a mixing apparatus 13 and leave the same in the form of an emulsion at a temperature below 0° C. Usually temperatures of −5 to −10° C. are created. The emulsion is fed to the pump 14, which, for instance, may be a plunger pump. The condensates flowing through the tubes 10 and 11 may also be combined by supplying the matter fed through the tube 10 to the liquefier 6. The solution of tetroxide and highly concentrated nitric acid, which leaves the tube 8 through the tube 12, may be fed into the mixing device 13 or introduced into the bleaching process to be described below (the path of the solution, when used in the bleaching process, is indicated in dashed lines in Fig. 1). The conduits 10, 11 and 12 may also merge separately into the mixing device 13. This mixing device contains a conduit through which the gases may escape. If desired, the gases generated may be reintroduced into the cooler 4 at the bottom of the same. (This connection between the mixing device and the cooler is not indicated in the drawings.) If necessary, a brine cooler and a filter are arranged in front of the pump 14. The cylinder and the plunger of the pump may, if desired, also be cooled. When working, the pump 14 is lubricated by means of a lubricant containing a colloidal silicic acid, for instance with a gel obtained as a precipitate by adding nitric acid to solutions of waterglass. The liquid mixture of water containing nitric acid and nitrogen tetroxide may be supplied to the pump 14 from a height of several meters or a low pressure pump of any desired construction, for instance a toothed wheel pump, may be arranged in front of the pump 14 in order to force the fluid into the latter. The pump 14 will raise the pressure of the liquid, which may be supplied in cooled and filtered state, to a considerable height, for instance to 40–60 atmospheres. If desired, a preheater may be arranged in the conduit 15, through which the fluid is forced into the autoclave 16. The compressor 17 feeds oxygen through the conduit 18 into the distributing device, which is arranged at the bottom of the autoclave 16. Said conduit 18 is equipped with elements adapted to prevent a back-flow of the gas and may, if desired, also be connected to a preheater. The finely subdivided oxygen ascends through the fluid in counter current to the latter and is absorbed. Hereby an increase of temperature is created. The temperature may, for instance, amount to more than 70° C. In many cases for instance temperatures of 80–90° C. will be reached. The autoclave 16 is preferably formed in such a manner that the reaction may take place within an exchangeable insertable body, whereby a pressure equalization between the interior space of the inserted body and the space between this body and the outer wall of the autoclave takes place. The last mentioned intermediate space should preferably be filled with oxygen. If desired, also a current of oxygen may be forced through the same. The reaction space proper may be filled with the fluid so that a finely subdivided oxygen will ascend through the same. In order to obtain as intimate a contact as possible between the oxygen and the fluid, fillers or baffle bodies may be arranged in the reaction space. Instead of forcing the oxygen through the fluid, the fluid may be caused to flow downward over fillers or baffle bodies. The non-absorbed constituents of the gas will leave the autoclave at the upper end of the same and may be reintroduced into the conduit 7 through the tube 19 or may be fed into the exit tube 9. The highly concentrated acid produced will leave the autoclave 16 through the conduit 20. The finished acid may, for instance, be an acid of 98%, which still contains some dissolved nitrogen oxides, for instance 10–20% $N_2O_4$. Acid of 99–100% may also be produced, whereby in some cases an increased surplus of tetroxide is obtained. When the fluid leaves the autoclave 16, it is relieved from the pressure and will flow into the bleaching vat 21, which is heated at the bottom and cooled at the top. The heating may, for instance, be performed by means of a steam jacket 22, and the cooling may be performed by means of a cooling jacket 23. The fluid may be fed into the bleaching vat below the cooling jacket. Said vat may, if desired, be equipped with filler bodies or the like. The fluid leaves the vat free from tetroxide at the bottom, whereas the vaporized nitrogen oxides in the upper part of the vat are cooled and freed from nitric acid. Through the conduit 24, the vaporized nitrogen oxides are again introduced into the liquefying device 6. Through the measures described above, the surplus of tetroxide is always recovered and may be reintroduced into the process. The composition of the gas mixture introduced into the process through the conduit 3 depends upon the amounts of starting materials used. According to the present example, the mixture will, for instance, contain about 18 g. of $H_2O$ to each 28 g. of N. The finished acid flows through a water cooler 25 and the conduit 26 into the storage container 27. The quantity of nitrogen flowing off in the form of acid of for instance 98% amounts to 95% or more of the nitrogen which was introduced in the form of ammonia, and amounts to 99–100% of the nitrogen, which was supplied to the pressure pump in the form of water-containing nitric acid and liquid nitrogen tetroxide.

When using the apparatus disclosed in Fig. 2, the process may for instance be carried out in the following manner:

*Example 2*

Ammonia is oxidized with preheated atmospheric air, for instance on platinum-rhodium contacts, whereby about 98% of the ammonia is converted into nitric oxide. The gas mixture is led through the air-preheater, the steam boiler and the heat exchanger and passed into the condenser 28, in which the surplus of steam is condensed. The condensed water is drawn off at 29. The cooler 30 will condense the steam needed for the formation of high percent acid. In the described apparatus the process is carried out under normal pressure. The gas space of the above named elements should be as narrow as possible. Through the conduit 31, the gas is conducted into the turbo compressor 32, which forces the gas through the water-cooled oxidation chamber 33, the temperature equalizer 34 and the conduit 35 into the liquefying device 36. The said compressor should hereby exert a pressure of several atmospheres, for instance 5–10 atmospheres. In the liquefying device 36, the gases are cooled to about −10° C., whereby nitrogen tetroxide is liquefied. At this temperature the gases are again reintroduced into the temperature equalizer 34 through the conduit 37. From the equalizer 34 the gases are forced into the absorption vessel 39 through the conduit 38. Said absorption vessel may, for instance, be equipped with several sieve bottoms or plates and with cooling surfaces. (In the drawings only 6 sieve bottoms are indicated.) From the vessel 39 the remaining gases are pressed through the conduit 40, the heat exchanger 41 and the conduit 42 into the turbine 43 in which the gases are relieved from the pressure and the energy of the gases is utilized. Also the steam created by the combustion of ammonia may be relieved from the pressure and utilized at this place. The remaining gases will finally escape through the tube 44. Through the conduit 45 the condensate from the cooler 30 is supplied to the absorption vessel 39 and flows through the same, under cooling, over the sieve bottoms (which may be equipped with overflow-devices), whereby the ascending gases are washed. The liquid tetroxide flowing off at 46 is fed into the mixing device 48. The liquid leaving the vessel 39 is fed through tube 47 into the mixing device 48 or through the tube 49 (shown in dashed lines) to the liquefying device 36. The liquid leaving the mixing device 48 contains nitrogen tetroxide, water and nitric acid in proportions adapted to give highly concentrated acid (for instance acid of 97–100%). The fluid is supplied to the pump 50, which is arranged at a level lying several meters below the described devices. The pump 50 will increase the pressure to a value several times as high as the original pressure, for instance to 20 or 50 atmospheres. At this pressure the fluid is fed through the tube 51 into the pressure tube 52, into which simultaneously oxygen is introduced through the tube 53 and the distributing device 54. The non-absorbed gas constituents are reintroduced into the conduit 38 through the tube 55. Through the conduit 56 the acid is supplied to the bleaching vat 57, in which normal atmospheric pressure is maintained during the operation. The nitrogen oxides, which are driven out, are either reintroduced into the conduit 31 through the tube 58 in the front of the turbo compressor, or liquefied by cooling and pumped into the mixing device 48. Through the cooler 59 the finished acid, which is free from tetroxide, is filled into the storage container 60. The yield in highly concentrated nitric acid may, for instance, amount to 95% or more.

Fig. 3 shows by way of example the construction of a pressure tube 62 for the simultaneous use of uni-directed current and of counter-current. The acid is introduced through the tube 64, rises within the interior inserted body 61, flows over the upper rim of this body and flows downward through the annular space between the tube 62 and the body 61, whereupon it leaves this space through the tube 65. The oxygen is introduced through the tube 66 and is by the distributor 63 finely distributed over the entire cross-sectional area, so that it will ascend through the body 61 in the same direction as the liquid and through the annular space between the body 61 and the tube 62 in counter-current to the liquid. The oxygen distributor 63 may for instance consist of ceramic filter plates or filter nipples or of sieve plates which are stable at the boiling temperature. The said plates or nipples are so arranged, that the oxygen is distributed over the entire cross-sectional area of the liquid and enters the same in the form of minute bubbles. 67 is an outlet tube through which the not absorbed gases may escape. 68 denotes a tube leading to a pressure gauge (not shown) and 69 denotes a tube for inserting a thermometer (not shown) and taking samples.

This example thus shows the use of uni-directed current and counter-current within the same vessel. Other constructional forms could of course also be used. The flow direction of the liquid may for instance be reversed and it would also be possible to use a plurality of vessels and cause the oxygen and the liquid to flow in the same direction through one of the vessels and in counter-current through the other vessel.

Figure 4 shows a different construction of a pressure pipe 70 suitable for a modification of the process, in which the liquid flows over a plurality of sieve members of progressively increasing free cross-sectional area. The liquid is forced through the pipe 71 into the pressure vessel 70 by means of a pump, such as that shown at 50 in Fig. 2, under pressure of 20 to 50 atmospheres. Oxygen is forced into the pressure pipe by means of the spraying device 81. Non-absorbed residual gases are carried back into the apparatus through the pipe 74 while highly concentrated nitric acid leaves the pressure pipe 70 through the pipe 75.

Within the pressure pipe 70 sieve members of progressively increasing cross-sectional area are disposed, these sieve members being indicated at 76, 77, 78, 79, and 80. It will be understood that the drawing is largely diagrammatical. The number of apertures in the individual sieves is of course greater than that shown. The drawing is for the purpose of illustrating the fact that the cross sectional area of the passages in the sieves is progressively greater from the top to the bottom. Instead of increasing the number of apertures in the direction of the flow of the liquid, the number may be kept constant while the diameter of the apertures alone is increased.

In the present example the pressure pipe 70 is completely filled with liquid up to a point above the member 76. If sieve members are used, such as represented in the tower 39 of Figure 2, the reaction chamber is not completely filled with the liquid but the liquid trickles down from the individual sieve members.

It will be understood that no restriction is made to the particular examples described in the above, and that numerous modifications and substitutions are quite possible within the meaning of the above description and the annexed claims without departing from the spirit of the invention.

I claim:

1. A process of producing highly concentrated nitric acid, i. e., nitric acid of 70% or more, comprising effecting the process in a single continuous operation by oxidizing ammonia catalytically, separating from the combustion gases water which is in excess of that required for the process, producing water-containing nitric acid and liquid nitrogen tetroxide from the resulting gases, continuously pumping said liquids, in proper proportion for producing the highly concentrated acid, into a reaction zone maintained at a pressure which is above atmospheric and which is sufficient for the reaction, causing the liquid to flow over several sieve members of progressively increasing free cross-sectional areas, supplying finely distributed oxygen in counter-current to the reaction zone and removing highly concentrated nitric acid from this space.

2. A process of producing highly concentrated nitric acid, i. e., nitric acid of 70% or more, comprising effecting the process in a single continuous operation by oxidizing ammonia catalytically, separating from the combustion gases water which is in excess of that required for the process, producing water-containing nitric acid and liquid nitrogen tetroxide from the resulting gases, continuously pumping said liquids, in proper proportion for producing the highly concentrated acid, into a recation zone maintained at a pressure which is above atmospheric and which is sufficient for the reaction, supplying oxygen to the reaction zone, causing the oxygen to flow through the reaction space partially in the same direction as said liquids and partially in countercurrent, and removing highly concentrated nitric acid from said space.

3. A process of producing highly concentrated nitric acid, i. e., nitric acid of 70% or more, comprising effecting the process in a single continuous operation by oxidizing ammonia catalytically, separating from the combustion gases water which is in excess of that required for the process, producing water-containing nitric acid and liquid nitrogen tetroxide from the resulting gases, continuously pumping said liquids, in proper proportion for producing the highly concentrated acid, into a reaction zone maintained at a pressure which is above atmospheric and which is sufficient for the reaction, lubricating the pump with inorganic colloids, supplying oxygen to the reaction zone and continuously removing the highly concentrated nitric acid from the reaction zone.

4. A process of producing highly concentrated nitric acid, i. e., nitric acid of 70% or more, comprising effecting the process in a single continuous operation by oxidizing ammonia catalytically, separating from the combustion gases water which is in excess of that required for the process, producing water-containing nitric acid and liquid nitrogen tetroxide from the resulting gases, continuously pumping said liquids, in proper proportion for producing the highly concentrated acid, into a reaction zone maintained at a pressure which is above atmospheric and which is sufficient for the reaction, lubricating the pump with silicic acid in colloidal form, supplying oxygen to the reaction zone and continuously removing the highly concentrated nitric acid from the reaction zone.

RUDOLF WENDLANDT.